United States Patent [19]
Plzak et al.

[11] Patent Number: 5,636,526
[45] Date of Patent: Jun. 10, 1997

[54] APPARATUS AND METHOD FOR AUTOMATICALLY PURGING AN ABSORPTION COOLING SYSTEM

[75] Inventors: William J. Plzak, Crescent, Minn.; Daoud A. Jandal, LaCrosse; Jeffrey S. Seewald, Onalaska, both of Wis.

[73] Assignee: Gas Research Institute, Chicago, Ill.

[21] Appl. No.: 535,793

[22] Filed: Sep. 28, 1995

[51] Int. Cl.⁶ .................. F25B 43/04; F25B 15/00
[52] U.S. Cl. ............................ 62/475; 62/476
[58] Field of Search .................... 62/85, 195, 475, 62/476

[56] References Cited

U.S. PATENT DOCUMENTS

| | | | |
|---|---|---|---|
| 2,363,381 | 11/1944 | Anderson | 62/119 |
| 2,367,708 | 1/1945 | Anderson | 62/119 |
| 2,374,521 | 4/1945 | Anderson | 62/119 |
| 2,374,564 | 4/1945 | Reid et al. | 62/119 |
| 2,384,860 | 9/1945 | Thomas | 62/119 |
| 2,384,861 | 9/1945 | Roswell | 62/119 |
| 2,432,978 | 12/1947 | Anderson | 62/119 |
| 2,494,972 | 1/1950 | Thomas et al. | 62/119 |
| 2,510,730 | 6/1950 | Whitlow | 62/119 |
| 2,510,737 | 6/1950 | Buffington | 62/119 |
| 3,146,602 | 9/1964 | Swearingen | 62/85 |
| 3,360,950 | 1/1968 | Osborne | 62/85 |
| 3,367,134 | 2/1968 | Bourne | 62/475 |
| 3,367,135 | 2/1968 | Greacen et al. | 62/475 |
| 3,949,566 | 4/1976 | Hopkins | 62/475 |
| 4,169,356 | 10/1979 | Kingham | 62/85 |
| 4,325,223 | 4/1982 | Cantley | 62/126 |
| 4,417,451 | 11/1983 | Spauschus | 62/129 |
| 4,467,623 | 8/1984 | Reimann | 62/494 |
| 4,594,856 | 6/1986 | Rothmeyer | 62/112 |
| 5,031,410 | 7/1991 | Plzak et al. | 62/85 |
| 5,060,487 | 10/1991 | Murray | 62/475 |
| 5,081,851 | 1/1992 | Murray | 62/475 |
| 5,261,246 | 11/1993 | Blackmon et al. | 62/85 |
| 5,339,654 | 8/1994 | Cook et al. | 62/476 |
| 5,369,959 | 12/1994 | Pfefferle et al. | 62/195 |

OTHER PUBLICATIONS

"Purge needs in absorption chillers," ASHRAE Journal, Oct. 1993, pp. 40–42, 44, 46, 47.

*Primary Examiner*—William Doerrler
*Attorney, Agent, or Firm*—McAndrews, Held & Malloy, Ltd.

[57] ABSTRACT

A purge apparatus and method are disclosed for automatically purging an absorption cooling system. Noncondensible gas is drawn out of the absorber of the absorption cooling system by an eductor. The eductor entrains the gas in the fluid flow to the high pressure side of the system. The gas is drawn out of the high pressure side by a separate purge refrigeration system. The evaporator of the purge refrigeration system is located in a purge tank that is in free flow communication with the condenser of the absorption cooling system. Refrigerant vapor and intermixed noncondensible gas flow into the purge tank and the refrigerant vapor condenses on the purge refrigeration system evaporator. The condensed absorption refrigerant is returned to the absorption cooling system. The noncondensible gas collects in the purge tank and blankets the evaporator of the purge refrigeration system, causing the temperature of the purge refrigerant to decrease. At a specified temperature, a temperature sensor initiates a pump out of the noncondensible gas in the purge tank.

34 Claims, 3 Drawing Sheets

1

APPARATUS AND METHOD FOR AUTOMATICALLY PURGING AN ABSORPTION COOLING SYSTEM

FIELD OF THE INVENTION

The present invention relates to a method and apparatus for purging noncondensible gas from an absorption cooling system.

BACKGROUND OF THE INVENTION

An absorption cooling system uses an absorbent solution and an absorption refrigerant combination to produce the cooling effect of the system. A generator heats the absorbent solution to drive the refrigerant from the solution, producing a refrigerant vapor. The refrigerant vapor is then cooled in a condenser to condense the refrigerant. The liquid refrigerant then flows to an evaporator. In the evaporator, the pressure on the liquid refrigerant is relieved, allowing it to evaporate at a lower temperature. The refrigerant draws heat into the system as it evaporates to produce the cooling effect of the absorption cooling system.

The refrigerant vapor then flows to an absorber. In the absorber, the refrigerant vapor is absorbed into the absorbent solution from the generator. After the refrigerant is absorbed into the solution, the absorbent solution returns to the generator and the cycle repeats.

An absorption cooling system generator is typically powered by natural gas, oil, or steam. The system typically operates at subatmospheric pressure. At subatmospheric pressure, the generator requires less heat to drive the refrigerant from solution, the refrigerant will evaporate in the evaporator at a lower temperature, and the system requires less energy input to produce its cooling effect.

However, an absorption cooling system faces a formidable problem when operated at subatmospheric pressure—air may leak into the system. The main component of air, nitrogen, is not condensible. Another source of noncondensible gas is chemical reactions within the system. The components of the system react with the absorbent solution to produce hydrogen, a noncondensible gas.

Noncondensible gas, from any source, hinders the performance of the system. Noncondensible gas migrates to the lowest pressure point in the system in the absorber. There, the gas may blanket off a portion of the absorber heat transfer surface and prevent reabsorption of the refrigerant into solution. Also, noncondensible gas increases the pressure of the system. Typically, the evaporator and the absorber share a common housing and pressure. If noncondensible gas is allowed to accumulate, the evaporator pressure may increase to the point that the refrigerant will not evaporate at the desired temperature. Accordingly, noncondensible gas must be removed or "purged" from the system.

In the prior art, noncondensible gas has been removed from the system in a variety of ways. Noncondensible gas has been removed from the absorber by pumps, siphons, aspirators, and other devices. These methods often require a complex system of fall tubes or aspirators.

In many prior art systems, the system cannot purge noncondensible gas unless the system is running. Many prior art systems utilize a diverted flow of absorbent solution or cooling water to operate the purge system. In these systems, the purge system is inoperable without a flow of these fluids.

However, noncondensible gas may collect in the system when it is shut down. Absorption cooling systems are typically maintained at subatmospheric pressure when the system is shut down and noncondensible gas may leak into the system. The noncondensible gas impedes start up of the system and adversely affects performance of the system until the noncondensible gas is collected and purged.

In many prior art systems, the noncondensible gas is collected in a purge tank. Many tanks must be purged manually. In other systems, the purge system interrupts the normal operation of the absorption cooling system.

Some prior art absorption cooling systems remove noncondensible gas from the absorber and collect the gas at absorber pressure. The gas is often collected in a storage tank before purging. These systems require either a large storage tank or frequent purging because of the relatively low absorber pressure.

The systems that collect noncondensible gas from the absorber must also transfer noncondensible gas in the condenser to the absorber. Often, these systems simply employ a large orifice between the condenser and the evaporator so that both condensed refrigerant liquid and noncondensible gas flow to the evaporator and eventually the absorber. These systems, however, have difficulty maintaining the necessary pressure differential between the condenser and the evaporator. In other cases, the system must employ a complex system of siphons or fall tubes to transfer the noncondensible gas from the condenser to the evaporator.

In an absorption cooling system, noncondensible gas is typically intermixed with refrigerant vapor. Therefore, to prevent loss of the refrigerant from the system, the noncondensible gas must be separated from the refrigerant. In the prior art, the noncondensible gas and intermixed refrigerant vapor have been bubbled through the absorbent solution to absorb the refrigerant vapor. Alternatively, the refrigerant vapor has been condensed on a condensation surface and separated from the noncondensible gas, which does not condense. In some systems, the system coolant fluid is used as a heat sink to condense the refrigerant vapor and separate it from the noncondensible gas. In other systems, the atmosphere is used as a heat sink. For optimum performance, however, a purge refrigeration system may be provided to condense and separate the refrigerant vapor.

U.S. Pat. No. 5,031,410, issued to Plzak, discloses a purge refrigeration system for a centrifugal chiller. In Plzak, the purge refrigeration system is a discrete refrigeration system that employs a refrigerant different from the main cooling system refrigerant. The purge refrigeration system evaporator is located in a purge tank. The purge tank is connected to the condenser of the main cooling system so that the refrigerant vapor and the noncondensible gas in the main cooling system may freely flow into the purge tank. In the purge tank, the refrigerant vapor is condensed on the evaporator of the purge refrigeration system and separated from the noncondensible gas. As the refrigerant vapor condenses, the purge refrigerant is warmed. The condensed refrigerant is returned to the main cooling system and the noncondensible gas is collected in the purge tank.

As the noncondensible gas collects in the purge tank, the noncondensible gas displaces the refrigerant vapor and blankets the purge refrigeration system evaporator. Accordingly, the purge refrigerant is no longer warmed by the refrigerant vapor. The purge refrigerant temperature is monitored by a temperature sensor. At a specified temperature detected by the temperature sensor, the noncondensible gas is pumped from the purge tank. The purge tank again fills with refrigerant vapor and the cycle repeats.

However, Plzak discloses a purge apparatus for use on a centrifugal chiller. A centrifugal chiller differs greatly from an absorption cooling system. For example, a centrifugal chiller uses a single refrigerant, such as R11, rather than a refrigerant and solution combination. A centrifugal chiller uses a compressor rather than a generator and an absorber. Also, a centrifugal chiller is typically powered by electricity rather than gas, oil, or steam. In addition, a centrifugal chiller operates at significantly higher pressures than an absorption cooling system. The condenser of an absorption cooling system operates at only approximately 1 p.s.i.a. (0.69 N/cm$^2$). In contrast, the condenser in a centrifugal cooling system operates at approximately 20 p.s.i.a. (14 N/cm$^2$). Accordingly, the challenges of purging a centrifugal chiller differ greatly from the challenges of purging an absorption cooling system.

First, as previously described, the noncondensible gas in an absorption cooling system must be transferred to a collection point. Also, the absorption cooling system operates at a significantly lower pressure. The lower pressure of the absorption cooling system makes it more difficult to draw noncondensible gas and absorption refrigerant vapor from the condenser to the purge tank. Also, when the absorption refrigerant is water, the temperature of the purge refrigerant may not be too low or the absorption refrigerant will freeze in the purge tank. To prevent freezing but still maintain the necessary temperature and pressure differential, the purge refrigerant must be maintained in a narrow temperature range.

Accordingly, it is an object of the present invention to provide a purge apparatus and method for removing noncondensible gas from an absorption cooling system that operates at subatmospheric pressure.

A further object of the present invention is to provide a purge apparatus and method that draws noncondensible gas from an absorber, directs the gas to the condenser, and purges the gas from the higher pressure condenser so that the volume of noncondensible gas to be purged is reduced.

Yet another object of the present invention is to provide a purge apparatus and method that separates noncondensible gas from intermixed refrigerant vapor by condensing the refrigerant vapor on the evaporator of a discrete purge refrigeration system.

An additional object of the present invention is to provide a purge apparatus and method that automatically senses when noncondensible gas should be purged from the system and automatically purges the gas.

A still further object of the present invention is to provide a purge apparatus and method that can track the purge rate so that air leaks in the system can be detected and corrected.

Another object of the present invention is to provide a purge apparatus and method that operates when the system is either operating or shut down.

Finally, an object of the present invention is to provide a purge apparatus and method that may be easily retrofitted to existing absorption cooling systems.

SUMMARY OF THE INVENTION

One aspect of the present invention is an absorption cooling system having a high pressure side and a low pressure side and operating by the circulation of an absorption refrigerant and an absorbent solution. A first path connects the low pressure side and the high pressure side and is adapted for transferring noncondensible gas from the low pressure side to the high pressure side, thereby reducing the volume of the noncondensible gas.

A purge refrigeration system operating by the circulation of a purge refrigerant different from the absorption refrigerant is also provided. A second path connects the high pressure side of the absorption cooling system to a purge tank. The second path allows for the flow of noncondensible gas and absorption refrigerant into the purge tank where the absorption refrigerant is condensed in heat exchange relationship with the purge refrigerant and separated from the noncondensible gas. A third path allows for the purging of the separated noncondensible gas from the purge tank.

A second aspect of the present invention is a method for removing noncondensible gas from an absorption cooling system having a high pressure side and a low pressure side and operating by the circulation of an absorption refrigerant and an absorbent solution.

Noncondensible gas is collected in the low pressure side of the absorption cooling system. A purge refrigeration system operating by the circulation of a purge refrigerant different from the absorption refrigerant is also provided. The noncondensible gas and the absorption refrigerant are directed to a purge tank where the absorption refrigerant is condensed in heat exchange relationship with the purge refrigerant of the purge refrigeration system and separated from the noncondensible gas. The separated noncondensible gas is collected in the purge tank and periodically purged.

The present invention offers the advantages of efficiently separating noncondensible gas from intermixed refrigerant vapor, collecting the noncondensible gas for purging when the system is either running or shut down, automatically sensing when noncondensible gas should be purged, and automatically purging the noncondensible gas. These and other advantages will become apparent as the specification is read in conjunction with the accompanying drawings and appended claims.

Figure 1:
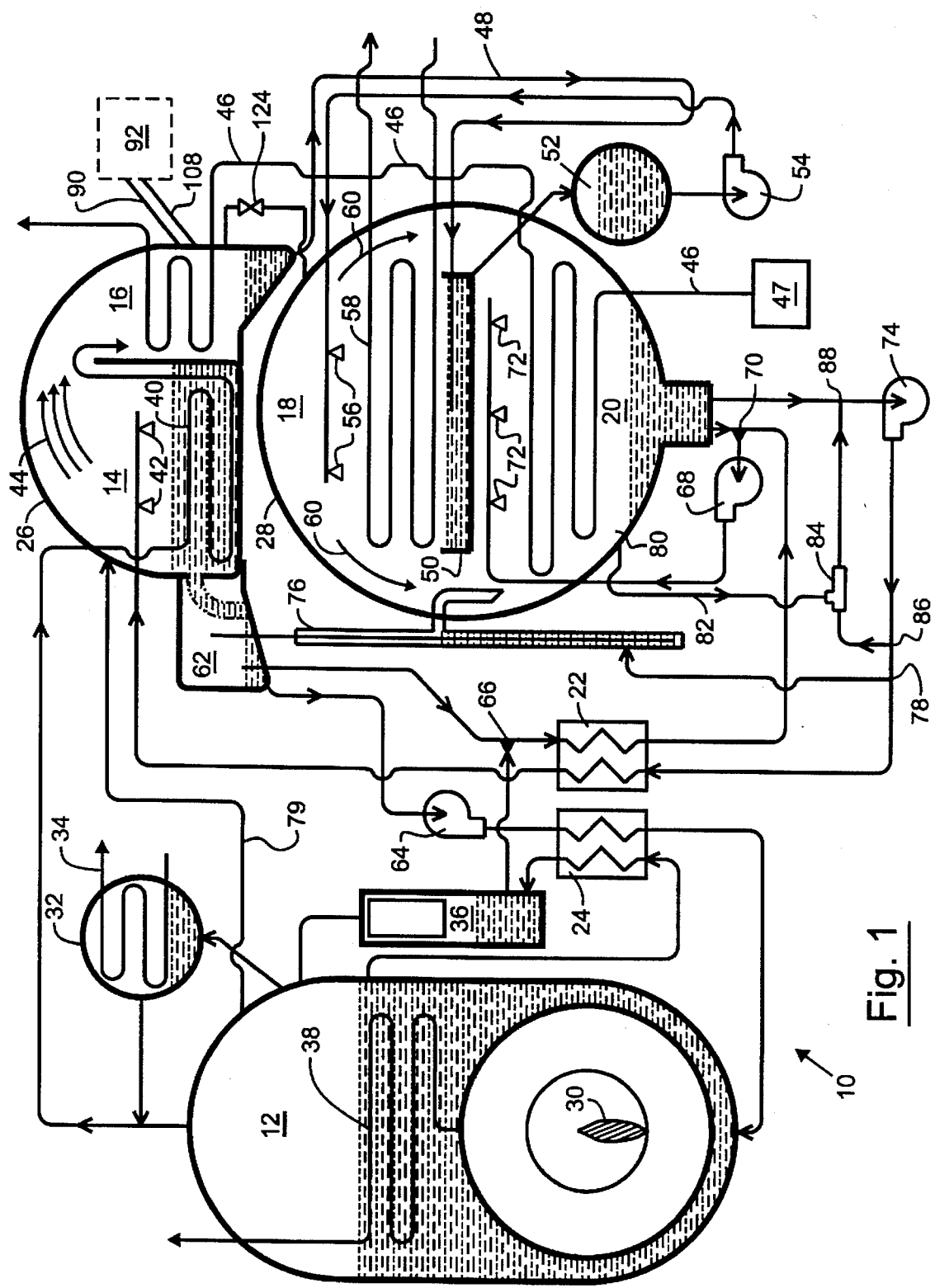
FIG. 1 is a schematic diagram of the absorption cooling system of the present invention.

In the figures, the following reference characters are used:
10 absorption cooling system
12 high temperature generator
14 low temperature generator
16 condenser
18 evaporator
20 absorber
22 low temperature heat exchanger
24 high temperature heat exchanger
26 low temperature generator/condenser shell
28 evaporator/absorber shell
30 heat source
32 hot water heater
34 hot system water conduit
36 float valve
38 flue
40 low temperature generator conduit
42 low temperature generator distributors
44 refrigerant vapor
46 cooling water conduit
47 cooling water source
48 condenser J-tube
50 evaporator tray
52 refrigerant storage tank
54 refrigerant pump
56 evaporator sprayers 58 chilled system water conduit
60 refrigerant vapor
62 solution outlet box
64 high temperature generator pump
66 junction
68 absorber pump
70 junction
72 absorber sprayers
74 low temperature generator pump
76 solution J-tube
78 junction
79 vent line
80 lowest pressure point
82 collection conduit
84 eductor
86 junction
88 junction
90 purge conduit
92 purge refrigeration system
94 purge system compressor
96 condensing unit
98 expansion device
100 evaporator coil
102 condenser coil
104 fan
106 purge tank
108 return conduit
110 absorption refrigerant vapor
112 condensed absorption refrigerant
114 noncondensible gas
116 temperature sensor
118 vacuum pump
120 control actuated valve
122 flow restrictor
124 valve

DETAILED DESCRIPTION OF THE PREFERRED EMBODIMENTS

Although the invention is described in connection with one or more preferred embodiments, the invention is not limited to those embodiments. The invention includes alternatives, modifications, and equivalents that are included in the spirit and scope of the appended claims.

FIG. 1 details a two-stage direct-fired absorption cooling system 10 of the present invention. The primary components of the absorption cooling system 10 include a high temperature generator 12, a low temperature generator 14, a condenser 16, an evaporator 18, an absorber 20, a low temperature heat exchanger 22, and a high temperature heat exchanger 24.

In the preferred embodiment, the low temperature generator 14 and the condenser 16 share a common shell 26 and, accordingly, operate at a relatively common pressure. The evaporator 18 and the absorber 20 also share a common shell 28 and operate at a relatively common, but lower, pressure. The low temperature generator 14 and the condenser 16 are traditionally referred to as the "high side" of the system and the evaporator 18 and absorber 20 as the "low side." The high side of the system operates at an approximate pressure of 0.5–1.7 p.s.i.a. (0.34–1.2 N/cm$^2$) and the low side operates at an approximate pressure of 0.095–0.15 p.s.i.a. (0.066–0.10 N/cm$^2$). As can be seen, the entire system operates well below the atmospheric pressure of 14.6 p.s.i.a. (10 N/cm$^2$).

An absorbent solution circulates through the system. The absorbent solution may comprise lithium bromide and water. When heated, some of the water may be driven from the lithium bromide solution to serve as a refrigerant. When the lithium bromide solution is least depleted of water, at a concentration of approximately 57% lithium bromide, the solution is referred to as a dilute solution. When the solution is more depleted of water, at a concentration of approximately 59–63% lithium bromide, the solution is referred to as an intermediate solution. When the solution is most depleted of water, at a concentration of approximately 65–66% lithium bromide, the solution is referred to as a concentrated solution. The solution is generically referred to as the absorbent solution and is distinguished from the refrigerant (water) that is driven from the solution.

Other absorbent solution combinations, such as ammonia and water, are known in the art. The present invention is not limited to the use of a particular absorbent solution combination.

The absorbent solution enters the high temperature generator 12 as an intermediate solution of approximately 60% lithium bromide at a temperature of about 275° F. (135° C.). The high temperature generator 12 operates at an approximate pressure of 4–12 p.s.i.a. (2.8–8.3 N/cm$^2$). (All concentrations, temperatures, and pressures are approximate, represent one embodiment, and may be varied without deviating from the teachings of the present invention.)

In the high temperature generator 12, a heat source 30 heats the intermediate solution to drive the refrigerant from the solution to form a refrigerant vapor. The exhaust gas of the heat source flows in a flue 38 to heat the solution. The exhaust gas exits the system at 350° F. (177° C.). The refrigerant vapor, at a temperature of 305° F. (152° C.), leaves the high temperature generator 12 and flows to the low temperature generator 14. The flow of the refrigerant vapor may be diverted to a hot water heater 32 to heat water in a hot system water conduit 34.

The absorbent solution leaving the high temperature generator 12 is a concentrated solution of 66% lithium bromide. The 320° F. (160° C.) concentrated solution flows to a high temperature heat exchanger 24. In the high temperature heat exchanger 24, the concentrated solution transfers heat to the intermediate solution flowing to the high temperature generator 12 and thereby preheats the intermediate solution. After leaving the high temperature heat exchanger 24, the concentrated solution, now at a temperature of 210° F. (99° C.), flows to a float valve 36. The float valve 36 regulates the pressure of the flow of concentrated solution. The concentrated solution then merges with the flow of an intermediate solution flowing from the low temperature generator 14 to the absorber 20.

The refrigerant vapor from the high temperature generator 12 flows in a low temperature generator conduit 40 in the low temperature generator 14 and heats a dilute solution. After transferring its heat, the refrigerant vapor condenses and flows to the condenser 16 at a temperature of 193° F. (89° C.).

The dilute solution enters the low temperature generator 14 through the low temperature generator distributors 42 at a temperature of 165° F. (74° C.) and a concentration of 57% lithium bromide. Heat released from the refrigerant vapor in the low temperature generator conduit 40 drives refrigerant from the dilute solution. The refrigerant vapor 44 from the dilute solution flows to the condenser 16.

In the condenser 16, the refrigerant from the high temperature generator 12 and the low temperature generator 14 are cooled by the cooling water supplied from the cooling water source 47 to the cooling water conduit 46. The refrigerant vapor condenses and collects in a pool at the bottom of the condenser 16. The cooling water enters the condenser 16 at 95° F. (35° C.) and, after absorbing the heat of condensation of the refrigerant vapor, exits the condenser at 100° F. (38° C.). The cooling water may be disposed or recycled through the system after cooling.

The condensed refrigerant exits the condenser 16 at a temperature of 102° F. (39° C.) and flows through a condenser J-tube 48 to the evaporator 18. The condenser J-tube 48 drops the pressure of the condensed refrigerant from the high side pressure of 0.5–1.7 p.s.i.a. (0.34–1.2 N/cm$^2$) to the low side pressure of 0.095–0.15 p.s.i.a. (0.066–0.10 N/cm$^2$). The condensed refrigerant collects in an evaporator tray 50 and flows to a refrigerant storage tank. The condensed refrigerant is then pumped by the refrigerant pump 54 back to the evaporator 18 and sprayed through the evaporator sprayers 56.

The condensed refrigerant evaporates in the evaporator 18 and absorbs heat from the water in the chilled system water conduit 58. This produces the cooling effect of the absorption cooling system. The water in the conduit 58 is typically chilled from a temperature of 54° F. (12° C.) when it enters the system to a temperature of 44° F. (7° C.) as it exits the system. The refrigerant vapor 60 flows from the evaporator 18 to the absorber 20.

Returning to the low temperature generator 14, the absorbent solution in the low temperature generator 14 is an intermediate solution of 59% lithium bromide. The intermediate solution, at a temperature of 175° F. (79° C.), flows to the solution outlet box 62. The high temperature generator pump 64 pumps a portion of the intermediate solution to the high temperature heat exchanger 24 where it is preheated to 275° F. (135° C.) before flowing to the high temperature generator 12.

Another portion of the intermediate solution in the solution outlet box 62 is mixed with concentrated solution (66% lithium bromide) from the high temperature generator 12 at the junction 66. The resulting intermediate solution has a concentration of 63% lithium bromide and a temperature of 200° F. (93° C.). The intermediate solution flows to the low temperature heat exchanger 22 and preheats the intermediate solution flowing to the low temperature generator 14. The intermediate solution from the low temperature generator 14 leaves the heat exchanger at a temperature of 118° F. (48° C.).

The intermediate solution then mixes with a flow of dilute solution from the absorber 20 at the junction 70. The resulting intermediate solution, at a temperature of 112° F. (44° C.) and a concentration of 61% lithium bromide, is then pumped by the absorber pump 68 to the absorber 20 and sprayed through the absorber sprayers 72.

The refrigerant vapor 60 flowing into the absorber 20 from the evaporator 18 is reabsorbed into the intermediate solution entering the absorber 20. The heat of the absorption is released to the cooling water from the cooling water source 47 in the cooling water conduit 46. The now dilute solution collects at the bottom of the absorber 20. The cooling water enters the absorber at 85° F. (29° C.) and exits the absorber at 95° F. (35° C.). The cooling water then flows to the condenser 16, as previously described.

The dilute solution, at a temperature of 95° F. (35° C.) and a concentration of 57% lithium bromide, exits the absorber 20 and is pumped by the low temperature generator pump 74 to the heat exchanger 22. The dilute solution is preheated in the low temperature heat exchanger 22 to a temperature of 165° F. (74° C.). The dilute solution is distributed in the low temperature generator 14 and the absorption cooling cycle repeats.

The present invention is not limited to the absorption cooling system cycle described and shown in FIG. 1. Other absorbent solution and refrigerant flow cycles are well known and one skilled in the art could easily adapt the present invention to those flow cycles.

The pressure differential between the high side and the low side is limited by the refrigerant J-tube 48 and a solution J-tube 76. The solution J-tube 76 limits the pressure differential between the high side and the low side by means of a column of solution in the solution J-tube 76. The solution is provided from a diverted flow of dilute solution from the low temperature generator pump 74 to the low temperature heat exchanger 22. The solution is diverted at the junction 78.

Noncondensible gas may leak into any portion of the system. As previously noted, the entire system operates at subatmospheric pressures. Accordingly, a leak in either the high side shell 26 or the low side shell 28 will result in noncondensible gas entering the system. In addition, all of the seals, joints, junctions, and conduits in the system are susceptible to leakage. Also, the lithium bromide in the absorbent solution may react with portions of the system to produce hydrogen. The high temperature of the high temperature generator 12 facilitates this reaction.

Although noncondensible gas may exist at any point in the system, it tends to flow to lower pressure points in the system. Therefore, noncondensible gas will flow from the higher pressure high temperature generator 12 to the lower pressure low temperature generator 14 and condenser 16 via vent line 79. In systems with an orifice between the condenser and evaporator, noncondensible gas freely flows from the condenser into the lower pressure evaporator and absorber.

In the low pressure side of the present system, the noncondensible gas migrates to the lowest pressure point 80 in the evaporator/absorber shell 28. This point is easily identified and well known to those skilled in the art. A collection conduit 82 is placed near the lowest pressure point 80 to collect the noncondensible gas in the absorber 20.

The collection conduit 82 draws noncondensible gas out of the absorber by means of an eductor 84. The eductor 84 is driven by a diverted flow of dilute solution. The dilute solution flowing from the low temperature generator pump 74 to the low temperature heat exchanger 22 is diverted at the junction 86 to the eductor 84. Approximately 5% of the dilute solution flow is diverted through the eductor 84.

The eductor 84 draws noncondensible gas and intermixed refrigerant vapor from the lowest pressure point 80 in the absorber 20 through the collection conduit 82 and into the eductor 84. The noncondensible gas and the intermixed refrigerant vapor are entrained in the dilute solution flow through the eductor 84 and join the flow of dilute solution from the absorber 20 to the low temperature generator pump 74 at the junction 88. The noncondensible gas thus flows with the dilute solution to the high side of the system.

In the high side shell 26, the noncondensible gas flows with the refrigerant vapor 44 to the condenser 16. The noncondensible gas and intermixed refrigerant vapor are drawn out of the condenser 16 through the purge conduit 90 by the purge refrigeration system 92.

The high side of the system operates at approximately ten times the pressure of the low side. Accordingly, upon reaching the high side, the noncondensible gas is compressed to approximately one-tenth of its former volume.

This offers many advantages over absorption cooling systems that purge noncondensible gas directly from the low side. In the present invention, the volume of noncondensible gas that must be collected and purged is greatly reduced. Therefore, the system need not be purged as frequently. Also, the storage tank for the noncondensible gas may be relatively small.

In addition, the present invention offers a simple and relatively inexpensive means for transferring the noncondensible gas to the high side. The eductor 84 is a simple device and easily adapted to an existing system. By directing the dilute solution flow and the entrained noncondensible gas back through the low temperature generator pump 74, the exit pressure in the eductor 84 is lowered and fluid flow through the eductor is encouraged. Although other means are available, the eductor 84 and path of the present invention are a simple and efficient means for directing the noncondensible gas from the low side to the high side. However, other means and paths would be within the scope of the present invention.

Figure 2:
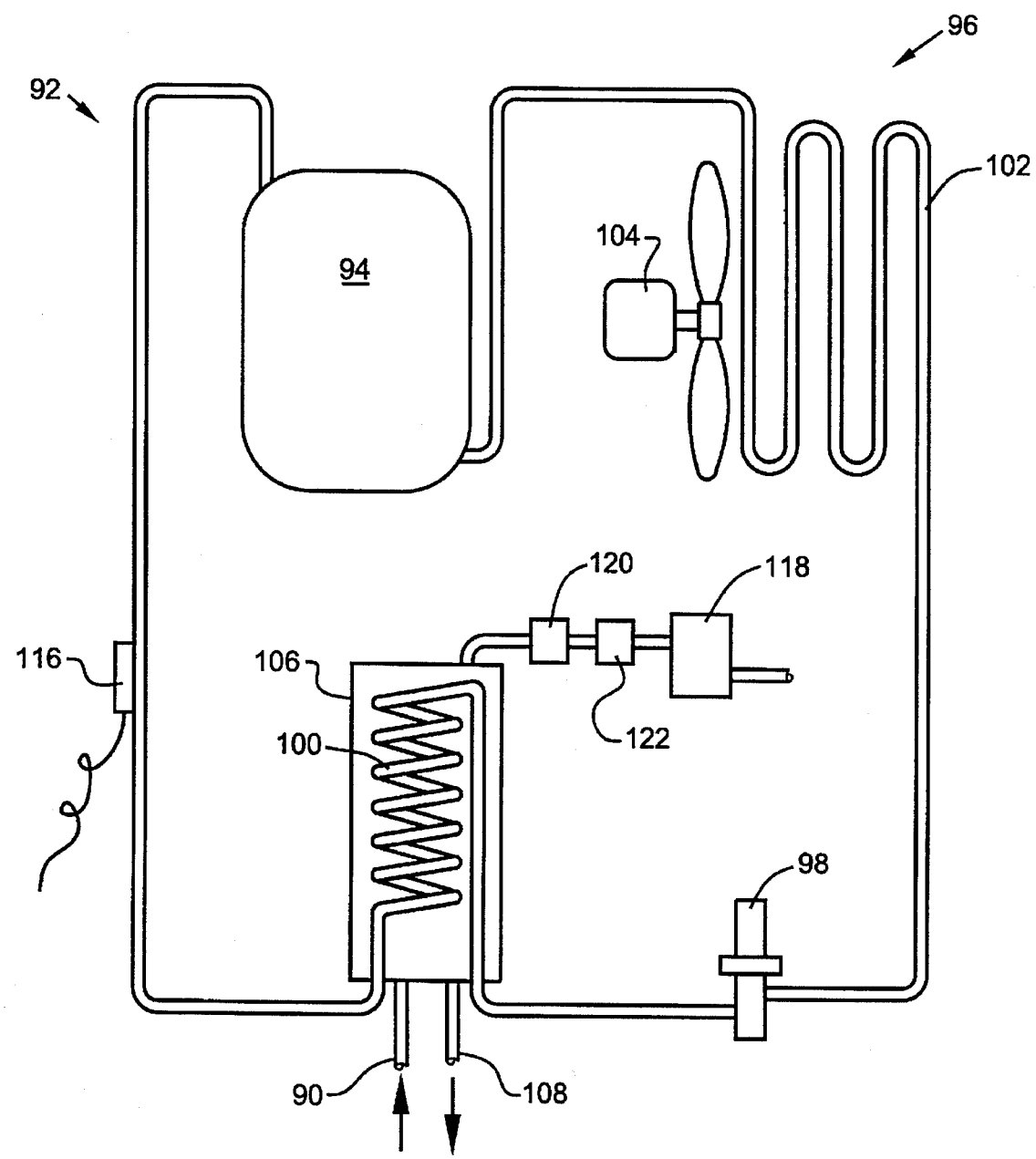
FIG. 2 is a schematic diagram of the purge refrigeration system of the present invention.

FIG. 2 is a schematic diagram of one embodiment of the purge refrigeration system 92 of the present invention. The purge refrigeration system 92 is an electrically powered, air-cooled, compression cooling system.

The purge refrigeration system 92 includes a purge system compressor 94, a condensing unit 96, an expansion device 98, and an evaporator coil 100. A single purge refrigerant circulates through the system.

The purge refrigerant is compressed by the purge system compressor 94. The purge refrigerant then flows through the condenser coil 102 of the condensing unit 96. The compressed purge refrigerant is cooled by the fan 104, which directs air through the condenser coil 102. The purge refrigerant condenses and the heat of condensation is transferred to the air moving through the coil 102. Although an air-cooled purge refrigeration system is preferred, other systems would fall within the teachings of the present invention.

The condensed purge refrigerant then flows through an expansion device 98. The expansion device 98 reduces the temperature of the condensed refrigerant to approximately 37° F. (3° C.) by relieving the pressure on the condensed refrigerant to a target pressure. The purge refrigerant then flows to the evaporator coil 100 where it evaporates. The purge refrigerant returns to the compressor 94 and the cycle repeats.

The evaporator coil 100 of the purge refrigeration system is located in a purge tank 106. The purge refrigerant flowing through the evaporator coil 100 is thus placed in heat exchange relationship with the interior of the purge tank 106. The purge tank 106 is connected to the absorption cooling system condenser 16 by the purge conduit 90 and the return conduit 108.

Because the purge refrigerant flowing through the purge refrigeration system evaporator coil 100 in the purge tank 106 is cooler than the refrigerant vapor in the absorption cooling system condenser 16, a temperature and pressure differential exists between the purge tank 106 and the condenser 16. The temperature and pressure differential causes refrigerant vapor and intermixed noncondensible gas to flow freely from the condenser 16 through the purge conduit 90 into the purge tank 106. In the purge tank 106, the refrigerant vapor condenses on the evaporator coil 100 and settles to the bottom of the tank. The noncondensible gas rises to the top of the purge tank 106. Thus, the absorption cooling refrigerant is separated from the noncondensible gas.

The condensed absorption refrigerant flows from the bottom of the purge tank 106 through the return conduit 108 to the condenser 16. Preferably, the condensed absorption refrigerant is returned to the condenser 16 in a separate conduit. However, the condensed absorption refrigerant may be returned to the condenser 16 through the purge conduit 90 that delivers the absorption refrigerant vapor to the purge tank 106. As a further alternative, the condensed absorption refrigerant may be returned to the low side of the system.

Figure 3:
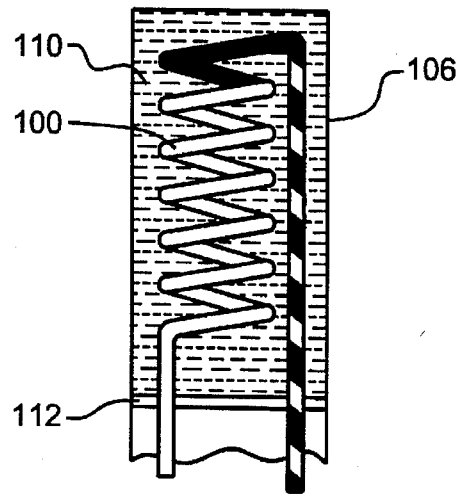
FIGS. 3, 4, and 5 schematically illustrate the accumulation of noncondensible gas in the purge tank.
Figure 4:
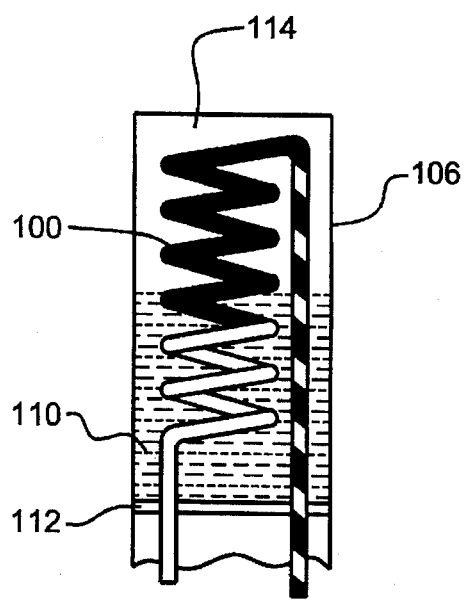
Figure 5:
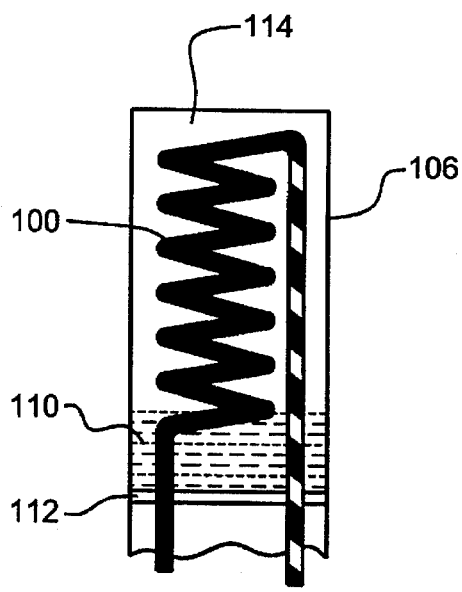

FIGS. 3, 4, and 5 show the interior of the purge tank 106 as noncondensible gas accumulates. In FIG. 3, the purge tank 106 is filled with absorption refrigerant vapor 110 and intermixed noncondensible gas. The absorption refrigerant vapor 110 condenses on the evaporator coil 100. As shown in FIG. 4, the condensed absorption refrigerant 112 falls to the bottom of the purge tank 106 and the separated noncondensible gas 114 displaces the absorption refrigerant vapor 110 at the top of the purge tank 106. As the process continues, noncondensible gas 114 eventually occupies substantially all of the purge tank 106, as shown in FIG. 5.

When the purge tank 106 is filled with absorption refrigerant vapor 110, as shown in FIG. 3, the purge refrigerant in the evaporator coil 100 is heated to approximately the temperature of the vapor 110. As noncondensible gas accumulates, as shown in FIG. 4, the evaporator coil 100 is partially blanketed by the noncondensible gas. Accordingly, because of the unfavorable heat exchange characteristics of air compared to the absorption refrigerant vapor 110, less heat is transferred to the purge refrigerant. The temperature of the purge refrigerant exiting the evaporator coil 100 decreases. When the purge tank 106 is substantially full of noncondensible gas, as shown in FIG. 5, the temperature of the purge refrigerant flowing through the evaporator coil 100 is essentially unchanged and remains at 37° F. (3° C.).

As shown in FIG. 2, a temperature sensor 116 monitors the temperature of the purge refrigerant flowing from the evaporator coil 100 to the purge system compressor 94. When the temperature of the purge refrigerant drops to 38° F. (3° C.), indicating that the purge tank 106 is substantially full of noncondensible gas, the temperature sensor 116 activates a pump out of the purge tank 106.

The temperature sensor 116 detects the temperature drop and generates a signal that activates a vacuum pump 118 and a control actuated valve 120. When closed, the valve 120 seals the purge tank 106 from the atmosphere. When activated, the valve 120 opens and the vacuum pump 118 draws the noncondensible gas from the purge tank 106 and releases it to the atmosphere.

A flow restrictor 122 may also be provided to reduce the flow rate of the noncondensible gas exiting the purge tank 106 to prevent water vapor from contaminating the vacuum pump.

After the noncondensible gas is evacuated from the purge tank 106, a mixture of absorption refrigerant vapor and noncondensible gas is again drawn through the purge conduit 90 into the purge tank 106. The mixture envelopes the evaporator coil 100 and the temperature of the purge refrigerant exiting the evaporator coil 100 increases. When the temperature sensor 16 senses that the purge refrigerant has reached a temperature of 45° F. (7° C.), the temperature sensor 116 generates a signal that closes the valve 120 and deactivates the vacuum pump 118. After the purge tank 106 again fills with noncondensible gas, the cycle repeats.

Instead of ending the pump out cycle by detecting a temperature rise at the temperature sensor 116, the pump out cycle may be deactivated by a timer. In that embodiment, after a predetermined time, the timer would initiate a signal to close the valve 120 and deactivate the vacuum pump 118. A timer may also be used to override the pump out cycle controls in the event that the temperature sensor 116 fails or a large leak develops in the absorption cooling system 10.

The pump out cycle could also be activated and deactivated manually. However, the automatic pump out cycle offers the advantage that it is easily monitored by a computer or plotter. The periodic purging of the absorption cooling system 10 may then be monitored to detect leaks. Also, the purging of the system may be tracked against environmental conditions to provide input on improving the performance of the system.

The present absorption cooling system is purged automatically and continuously while the system operates. In addition, unlike many prior art systems, the absorption cooling system may be purged when the system is shut down.

When the system is shut down, the high side and the low side may be placed in free flow communication by opening a valve 124, shown in FIG. 1. The valve 124 allows noncondensible gas in the low side to be drawn directly to the high side and into the purge tank 106. Therefore, with the valve 124 open, the system may be maintained at subatmospheric pressure during shut down. At start up, the valve 124 is closed and the system is not impeded by noncondensible gas during start up.

The inventors contemplate several modifications that may be made to the preferred embodiment of the present invention that fall within the scope of the present invention. For example, the evaporator coil 100 of the purge refrigeration system 92 may be placed inside the low temperature generator/condenser shell 26. Also, the noncondensible gas drawn from the absorber 20 may be simply compressed and sent to the purge tank 106. Alternatively, if lithium bromide and water is not used as the absorbent solution and refrigerant combination, the purge refrigeration system 92 may be connected directly to the absorber 20.

Despite the additional challenges of purging an absorption cooling system, the apparatus and method disclosed above allow for the efficient purging and operation of an absorption cooling system.

Although a preferred embodiment of the present invention has been described, those skilled in the art will recognize other modifications that may be made that would nonetheless fall within the teachings of the present invention. Therefore, the present invention should not be limited to the apparatus and method described. Instead, the scope of the present invention should be consistent with the invention claimed below.

What is claimed is:

1. An absorption cooling system, comprising:
  a) a high pressure side and a low pressure side, the absorption cooling system operating by the circulation of an absorption refrigerant and an absorbent solution;
  b) a first path connecting and adapted for transferring noncondensible gas from the low pressure side to the high pressure side;
  c) a purge refrigeration system operating by the circulation of a purge refrigerant different from the absorption refrigerant;
  d) a second path allowing for the flow of noncondensible gas and absorption refrigerant in the high pressure side of the absorption cooling system in heat exchange relationship with the purge refrigerant to condense the absorption refrigerant and separate the absorption refrigerant from the noncondensible gas;
  e) a third path allowing for the purging of the separated noncondensible gas from the absorption cooling system.

2. The apparatus of claim 1, further including a purge tank; wherein the second path includes a first conduit and the purge tank; the first conduit connecting the high pressure side of the absorption cooling system to the purge tank and allowing for the flow of noncondensible gas and absorption refrigerant into the purge tank where the absorption refrigerant is condensed in heat exchange relationship with the purge refrigerant of the purge refrigeration system and separated from the noncondensible gas.

3. The apparatus of claim 2, wherein the separated noncondensible gas collects in the purge tank for periodic purging from the absorption cooling system via the third path.

4. The apparatus of claim 1, wherein the purge refrigeration system is comprised of a purge system compressor, a condensing unit, and an evaporator.

5. The apparatus of claim 4, wherein the purge refrigerant in the evaporator of the purge refrigeration system is in heat exchange relationship with the absorption refrigerant to condense the absorption refrigerant and separate the absorption refrigerant from the noncondensible gas.

6. The apparatus of claim 1, further including a sensor for automatic activation of the purging of the separated noncondensible gas from the absorption cooling system.

7. The apparatus of claim 1, wherein the high pressure side and the low pressure side of the absorption cooling system operate at subatmospheric pressure.

8. The apparatus of claim 7, further including a vacuum pump for purging the separated noncondensible gas from the absorption cooling system.

9. The apparatus of claim 1, wherein the first path further includes an eductor operating by a diverted flow of the absorption refrigerant and the absorbent solution; the eductor drawing noncondensible gas from the low pressure side of the absorption cooling system and entraining the noncondensible gas in the flow of the absorbent solution to the high pressure side of the absorption cooling system.

10. The apparatus of claim 1, further including a valve between the high pressure side and the low pressure side of the absorption cooling system; the valve allowing for continuous purging of the absorption cooling system when the system is not operating.

11. An absorption cooling system, comprising:
  a) a high pressure side and a low pressure side, the absorption cooling system operating by the circulation of an absorption refrigerant and an absorbent solution;
  b) a first path connecting and adapted for transferring noncondensible gas from the low pressure side to the high pressure side;
  c) a purge refrigeration system operating by the circulation of a purge refrigerant different from the absorption refrigerant;
  d) a purge tank;
  e) a second path connecting the high pressure side of the absorption cooling system to the purge tank and allowing for the flow of noncondensible gas and absorption refrigerant into the purge tank where the absorption refrigerant is condensed in heat exchange relationship with the purge refrigerant of the purge refrigeration system and separated from the noncondensible gas;
  f) a third path allowing for the purging of the separated noncondensible gas from the purge tank.

12. The apparatus of claim 11, further including a second conduit connecting the purge tank to the absorption cooling system and allowing for the return of condensed absorption refrigerant from the purge tank to the absorption cooling system.

13. The apparatus of claim 12, wherein the second conduit returns the condensed refrigerant to the high pressure side of the absorption cooling system.

14. The apparatus of claim 12, wherein the second conduit returns the condensed refrigerant to the low pressure side of the absorption cooling system.

15. The apparatus of claim 11, wherein the first conduit returns the condensed refrigerant to the absorption cooling system.

16. The apparatus of claim 11, wherein the purge refrigeration system is comprised of a purge system compressor, a condensing unit, and an evaporator.

17. The apparatus of claim 16, wherein the evaporator of the purge refrigeration system is located in the purge tank such that the absorption refrigerant and the purge refrigerant are in heat exchange relationship to condense the absorption refrigerant and separate the absorption refrigerant from the noncondensible gas in the purge tank.

18. The apparatus of claim 17, further including a temperature sensor for monitoring the temperature of the purge refrigerant; the temperature sensor activating the purging of the separated noncondensible gas from the purge tank upon the temperature of the purge refrigerant falling below a predetermined temperature caused by the blanketing of the purge refrigeration system evaporator with separated noncondensible gas.

19. The apparatus of claim 18, wherein the temperature sensor deactivates the purging of the separated noncondensibles from the purge tank upon the temperature of the purge refrigerant rising above a predetermined temperature caused by the blanketing of the purge refrigeration system evaporator with absorption refrigerant.

20. The apparatus of claim 11, wherein the high pressure side and the low pressure side of the absorption cooling system operate at subatmospheric pressure.

21. The apparatus of claim 20, further including a vacuum pump for purging of the separated noncondensible gas from the purge tank.

22. The apparatus of claim 11, wherein the first path further includes an eductor operating by a diverted flow of the absorption refrigerant and the absorbent solution; the eductor drawing noncondensible gas from the low pressure side of the absorption cooling system and entraining the noncondensible gas in the flow of the absorbent solution to the high pressure side of the absorption cooling system.

23. The apparatus of claim 11, further including a valve between the high pressure side and the low pressure side of the absorption cooling system; the valve allowing for continuous purging of the absorption cooling system when the system is not operating.

24. A method of removing noncondensible gas from an absorption cooling system having a high pressure side and a low pressure side, the absorption cooling system operating by the circulation of an absorption refrigerant and an absorbent solution, comprising the steps of:

(a) collecting noncondensible gas in the low pressure side of the absorption cooling system;

(b) providing a purge refrigeration system operating by the circulation of a purge refrigerant different from the absorption refrigerant;

(c) directing the noncondensible gas and the absorption refrigerant to a purge tank where the absorption refrigerant is condensed in heat exchange relationship with the purge refrigerant of the purge refrigeration system and separated from the noncondensible gas;

(d) collecting the separated noncondensible gas in the purge tank;

(e) periodically purging the separated noncondensible gas from the purge tank.

25. The method of claim 24, further including the step of compressing the noncondensible gas and absorption refrigerant prior to directing them to the purge tank.

26. The method of claim 25, further including the steps of: directing the noncondensible gas to the high side of the absorption cooling system to compress the noncondensible gas prior to directing it to the purge tank, thereby reducing the volume of noncondensible gas to be removed.

27. The method of claim 26, further including the step of returning the condensed absorption refrigerant from the purge tank to the high pressure side of the absorption cooling system.

28. The method of claim 26, further including the step of returning the condensed absorption refrigerant from the purge tank to the low pressure side of the absorption cooling system.

29. The method of claim 26, further including the steps of: monitoring the temperature of the purge refrigerant in the purge refrigerant system; activating the purging of the separated noncondensible gas from the purge tank upon the temperature of the purge refrigerant reaching a predetermined temperature.

30. The method of claim 29, further including the step of deactivating the purging of the separated noncondensible gas from the purge tank upon the temperature of the purge refrigerant reaching a predetermined temperature.

31. The method of claim 26, further including the step of operating the high pressure side and the low pressure side of the absorption cooling system at subatmospheric pressures.

32. The method of claim 31, further including the step of purging the separated noncondensible gas from the purge tank with a vacuum pump.

33. The method of claim 26, further including the steps of: directing the flow of the absorption refrigerant and the absorbent solution through an eductor; drawing noncondensible gas from the low pressure side of the absorption cooling system to the eductor; entraining the noncondensible gas in the flow of the absorbent solution at the eductor; directing the entrained noncondensible gas to the high pressure side of the absorption cooling system in the flow of the absorption refrigerant and the absorbent solution.

34. The apparatus of claim 26, further including the steps of: shutting down the absorption cooling system; opening a valve between the high pressure side and the low pressure side of the absorption cooling system; removing noncondensible gas from the absorption cooling system while the absorption cooling system is not operating.

* * * * *